United States Patent
Wang et al.

(10) Patent No.: US 8,565,532 B2
(45) Date of Patent: Oct. 22, 2013

(54) EDGE-BASED APPROACH FOR INTERACTIVE IMAGE EDITING

(75) Inventors: Jue Wang, Kenmore, WA (US); Shulin Yang, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 31 days.

(21) Appl. No.: 13/221,786

(22) Filed: Aug. 30, 2011

(65) Prior Publication Data

US 2013/0121593 A1 May 16, 2013

Related U.S. Application Data

(60) Provisional application No. 61/498,343, filed on Jun. 17, 2011.

(51) Int. Cl.
*G06K 9/48* (2006.01)

(52) U.S. Cl.
USPC .......................................................... 382/199

(58) Field of Classification Search
None
See application file for complete search history.

(56) References Cited

U.S. PATENT DOCUMENTS 7,110,602 B2    9/2006   Krause

OTHER PUBLICATIONS

Gozde Bozkurt, "Curve and Polygon Evolution Techniques for Image Processing", 2002, PhD Dissertation, North Carolina State University.*

Vladimir Vezhnevets and Vadim Konouchine, "GrowCUT—Interactive Multi-Label N-D Image Segmentation by Cellular Automata", 2005.*

Yuri Boykov; Olga Veksler; and Ramin Zabih, "Fast Approximate Energy Minimization via Graph Cuts", Nov. 2001, IEEE Transactions on Pattern Analysis and Machine Intelligence, vol. 23, No. 11.*

Kass, M., Witkin, A., and Terzopoulos, D., Snakes: Active Contour Models, International Journal of Computer Vision, 1 (4): pp. 321-331, Jan. 1988.

Canny, J.F., A computational approach to edge detection, IEEE Trans. Pattern Analysis and Machine Intelligence, vol. 8, issue 6, pp. 679-698, Nov. 1986.

* cited by examiner

*Primary Examiner* — Samir Ahmed
*Assistant Examiner* — Siamak Harandi
(74) *Attorney, Agent, or Firm* — Wolfe-SBMC

(57) ABSTRACT

A method, system, and computer-readable storage medium are disclosed for aligning user scribbles to edges in an image. A plurality of edges in the image may be determined. User input comprising a scribble may be received, wherein the scribble comprises a freeform line overlaid on the image. The scribble may be automatically aligned to one or more of the edges in the image.

20 Claims, 10 Drawing Sheets

EDGE-BASED APPROACH FOR INTERACTIVE IMAGE EDITING

PRIORITY INFORMATION

This application claims benefit of priority of U.S. Provisional Application Ser. No. 61/498,343 entitled "An Edge-Based Approach for Interactive Image Editing" filed Jun. 17, 2011, the content of which is incorporated by reference herein in its entirety.

BACKGROUND

1. Field of the Invention

The present invention is directed to computer systems; and more particularly, it is directed to interactive editing of digital images.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For example, it may be desirable to select a region within a digital image and apply a particular image transformation to the selected region.

In an approach referred to as "region-based scribbling," the user may enter a freeform "scribble" inside an object in an image and another scribble outside the object; a mask may then be determined for the object based on the scribbles. In the case of foreground-background separation, the user may be required to place foreground scribbles inside a foreground object and background scribbles outside the foreground object. To create multiple regions, scribbles may be required to be placed inside each region to function as seeds. Various algorithms may then be employed to partition the image into two or more regions, using the scribbles as hard constraints.

SUMMARY

Various embodiments of systems, methods, and computer-readable storage media for aligning user scribbles to edges in an image are disclosed. A plurality of edges in the image may be determined. The edges may comprise low-level edges. User input comprising a scribble may be received. The scribble may comprise a freeform line overlaid on the image. The scribble may be automatically aligned to one or more of the edges in the image.

In one embodiment, further user input may be received to modify the aligned scribble. The image may be modified based on the user input to modify the aligned scribble.

In one embodiment, automatically aligning the scribble to one or more of the edges in the image may comprise determining a plurality of match scores. Each match score may comprise a correspondence between a point on the scribble and a point on one of the edges in the image. In one embodiment, automatically aligning the scribble to one or more of the edges in the image may comprise selecting one or more candidate points for each point on the scribble, wherein the candidate points comprise points on the edges in the image.

In one embodiment, automatically aligning the scribble to one or more of the edges in the image may comprise minimizing an energy function. The energy function may comprise an image energy component and a shift energy component. The image energy component may comprise an image match component and an image continuity component. The shift energy component may comprise a shift match component and a shift continuity component.

Figure 1:
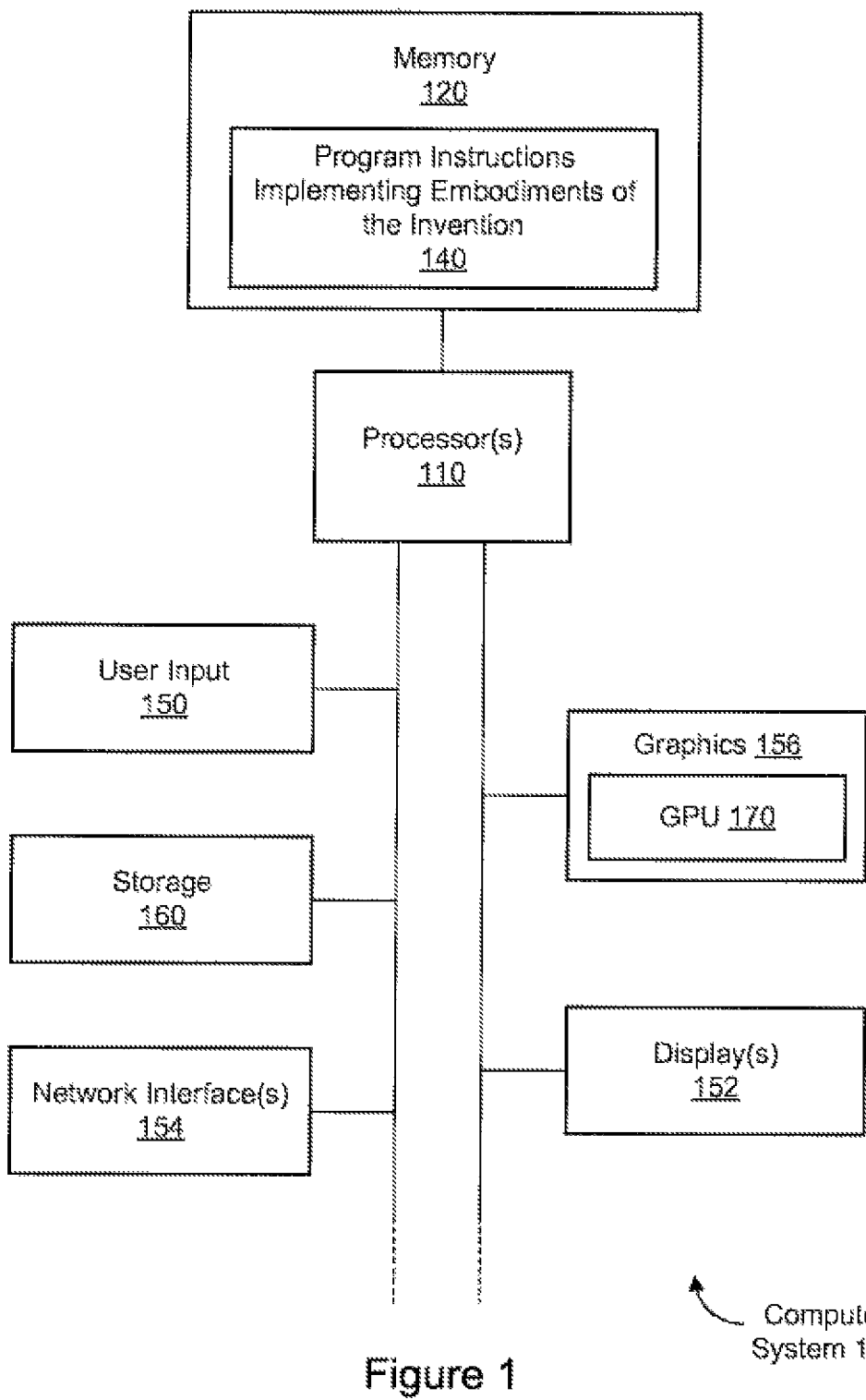
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm as described herein, is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to perform an edge-based approach for interactive image editing. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
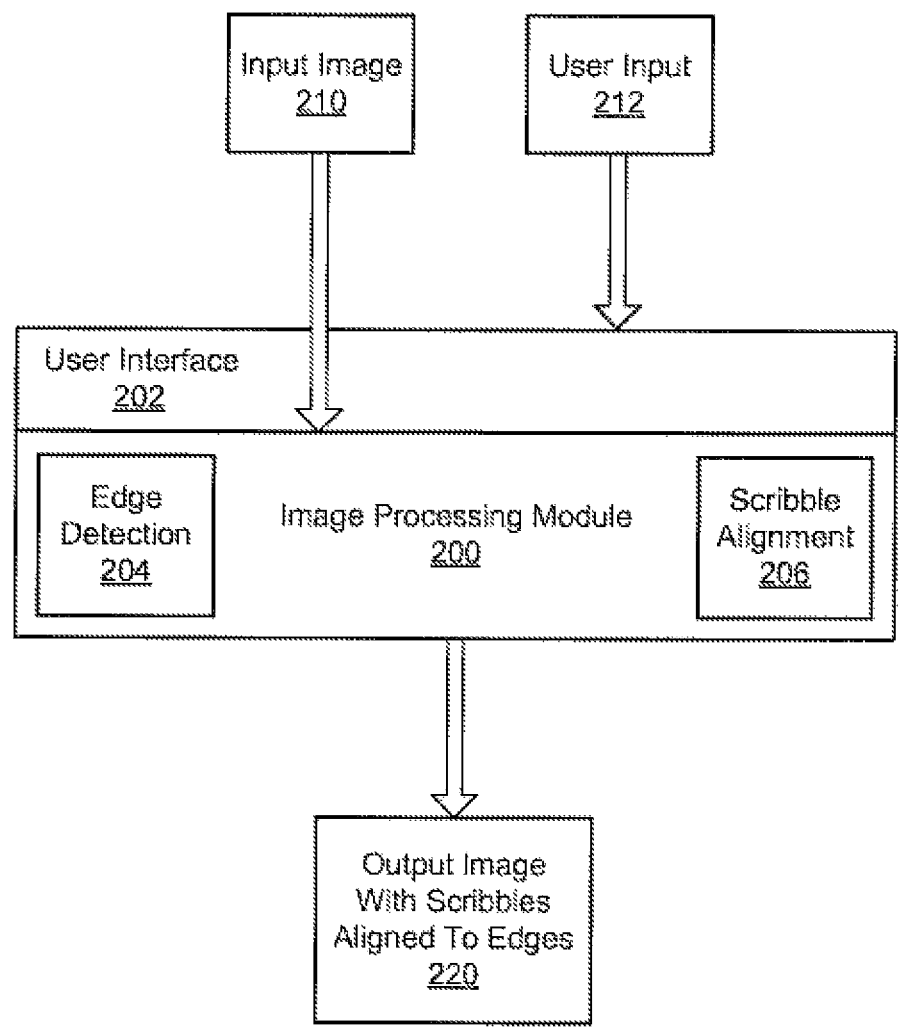
FIG. 2 illustrates an example image processing module, according to one embodiment.

FIG. 2 illustrates an example image processing module 200 that may implement embodiments of a method for interactive image editing. In one embodiment, module 200 may provide a user interface 202 that includes one or more user interface elements via which a user may initiate, interact with, direct, and/or control the method performed by module 200. Module 200 may obtain at least one digital image 210 as input. Module 200 may also obtain user input 212, such as one or more "scribbles" entered by a user. The one or more scribbles may be overlaid on the input image 210 to indicate the user's estimation of the location of one or more edges in the image. The scribbles may be entered by the user using any appropriate user interface elements, such as a freeform line tool or other appropriate tool provided by a user interface 202 associated with digital image editing software. As will be described below in greater detail, the scribbles may be aligned to low-level edges in the image 210. An edge detection module 204 may be used to perform the low-level edge detection, and a scribble alignment module 206 may be used to perform the alignment of scribbles to the detected edges. In one embodiment, the edge detection 204 may be performed automatically and/or programmatically. In one embodiment, the scribble alignment 206 may be performed automatically and/or programmatically. In one embodiment, the module 200 may produce an output image 220 including the aligned scribbles. In one embodiment, after the alignment of the scribbles to the edges, the aligned scribbles may be used for interactive editing of the image 210.

Image processing module 200 may be implemented as or in a stand-alone application or as a module of or plug-in for an image processing and/or presentation application. Examples of types of applications in which embodiments of module 200 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images. Specific examples of applications in which embodiments may be implemented include, but are not limited to, Adobe® Photoshop® and Adobe® Illustrator®. In addition to generating output image 220, module 200 may be used to display, manipulate, modify, and/or store output images, for example to a memory medium such as a storage device or storage medium.

Figure 3A:
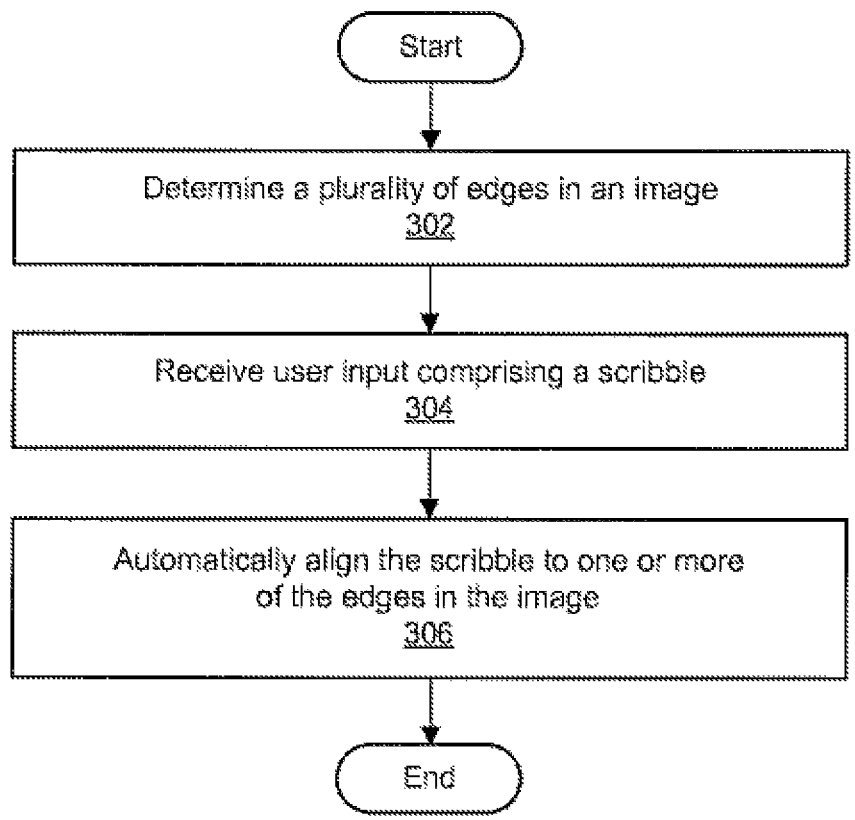
FIGS. 3A and 3B are flowcharts illustrating methods for performing an edge-based approach for interactive image editing, according to one embodiment.
Figure 3B:
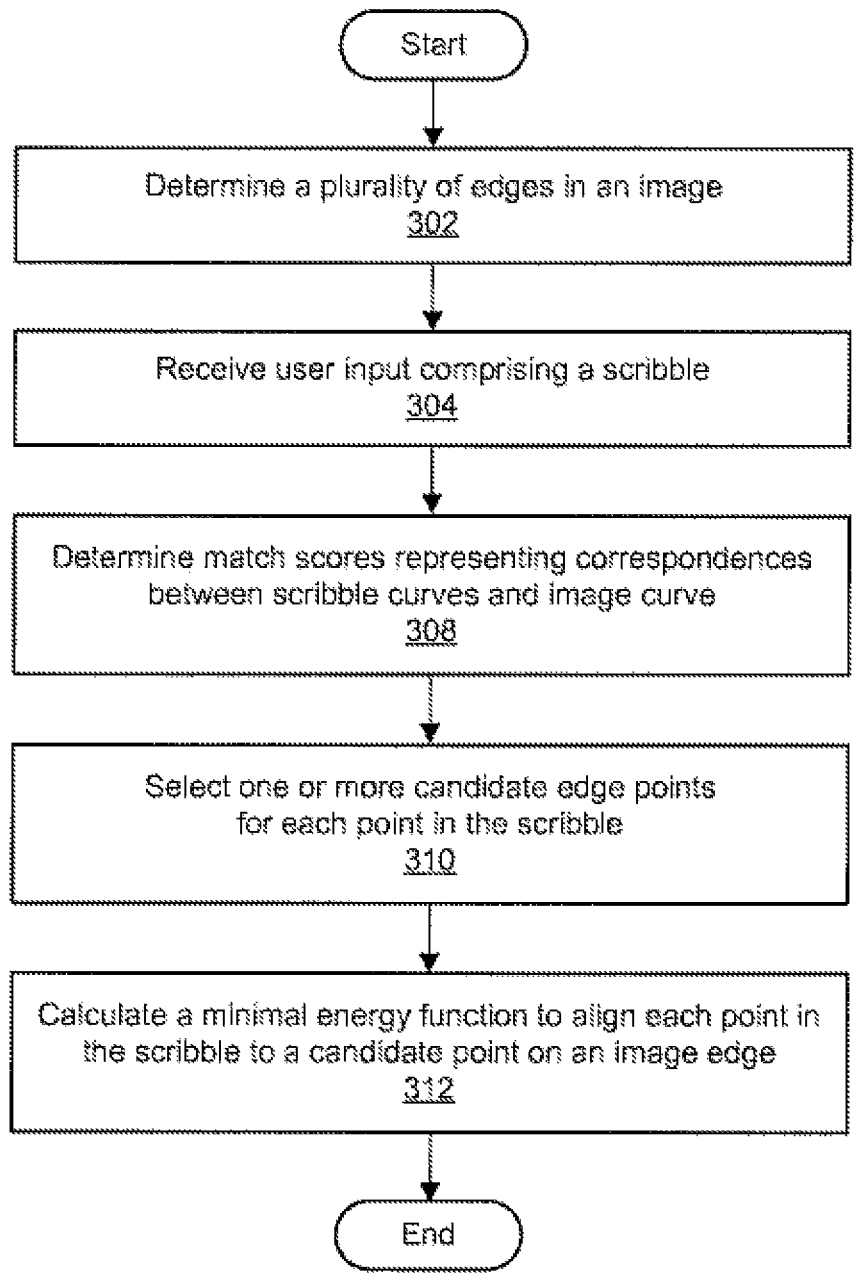

FIGS. 3A and 3B are flowcharts illustrating method for performing an edge-based approach for interactive image editing, according to one embodiment. The methods shown in FIGS. 3A and 3B may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in block 302 of FIG. 3A, a plurality of edges in the image may be determined. In one embodiment, the edges may be low-level edges. Low-level edges are typically short and consistent. In one embodiment, a Canny detector may be used for edge detection and to trace along neighboring edges to form image curves. However, any suitable edge detection technique may be used.

As shown in block 304, user input comprising at least one scribble may be received. The scribble may comprise a freeform line overlaid on the image. As shown in block 306, the scribble may be automatically aligned to one or more of the edges in the image. The operation shown in block 306 is discussed in greater detail below.

In a prior approach referred to as "region-based scribbling," the user may enter a freeform "scribble" inside an object in an image and another scribble outside the object; a mask may then be determined for the object based on the scribbles. In the case of foreground-background separation, the user may be required to place foreground scribbles inside a foreground object and background scribbles outside the foreground object. To create multiple regions, scribbles may be required to be placed inside each region to function as seeds. Various algorithms may then be employed to partition the image into two or more regions, using the scribbles as hard constraints.

As described herein, scribbles may be placed on image edges rather than within image regions. The ability to define, control, and manipulate image edges may yield advantages in applications such as image stylization, image warping, object deformation, and other suitable applications in which image edges play a dominant role. As described herein, rough or inaccurate user scribbles may be automatically and accurately aligned with image edges in an efficient manner. The aligned scribbles may then be used for editing or manipulation of the image.

In one embodiment, edge-based scribbling as described herein may be used as a complementary tool with region-based scribbling. For example, a common problem encountered with region-based scribbling is bleeding over weak edges, i.e., when the masks of two adjacent regions eat into each other. In one embodiment, placing an edge scribble over the weak edges may be used to correct this problem.

Described herein are systems, methods, and computer-readable media for efficient edge tracing using rough user scribbles. In one embodiment, low-level edges may be used instead of the raw pixel values in the image to constrain the solution space for a more efficient outcome. Because the user scribbles may be inaccurate, the scribbles may roughly follow an image edge but may deviate from the edge at some points. However, because the low-level image edges may be close to each other, simply finding the closest edge to snap to may produce inaccurate results. Similarly, since traditional edge-detection methods such as Snake may employ greedy search algorithms, such techniques may easily get stuck at local minima. Therefore, as described in greater detail below, a new energy function comprising multiple terms may be used to align or "snap" each user scribble to image edges in a consistent way. The energy function may be minimized using dynamic programming techniques to achieve a global minimum of the energy. Experimental results show that the techniques described herein may effectively align rough user scribbles to the correct image edges even in complicated cases, and in a manner that outperforms traditional methods such as Snake.

In one embodiment, an algorithm may be used to trace image edges based on rough user scribbles. Specifically, the algorithm may align edge scribbles to new positions on the image edges. This problem may be formulated as an energy-based global optimization problem. Given a set of edge scribbles $\{s_k\}$ and an image I, each point in the set of edge scribbles $s_k$ may be aligned to an image edge $e_k$. The energy of the alignment may be given as follows by equation 1:

$$E(\{s_k\},\{e_k\},I) = E_{match\_i} + \lambda E_{continuity\_i} + \mu E_{match\_s} + \nu E_{continuity\_s} \quad (1)$$

Figure 4:
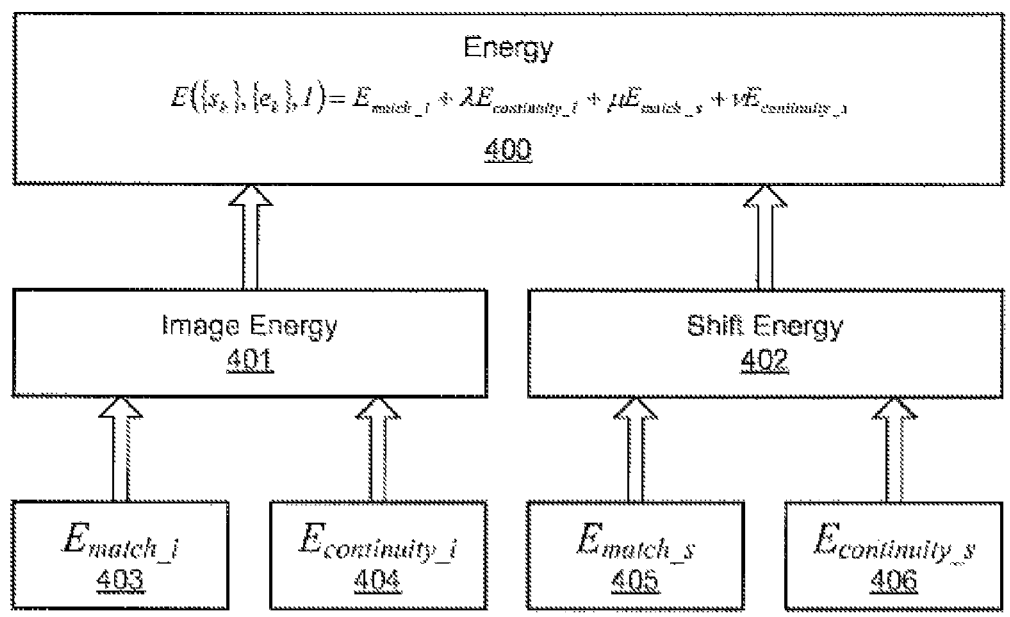
FIG. 4 illustrates components of an energy function used to align scribbles to image edges, according to one embodiment.

FIG. 4 illustrates components of an energy function 400 used to align scribbles to image edges, according to one embodiment. An image match component $E_{match\_i}$ and an image continuity component $E_{continuity\_i}$ represent image energy 401. $E_{match\_i}$ 403 represents how well the points resulting from the alignment match to image features, and $E_{continuity\_i}$ 404 represents the continuity of the image features that the points cover. A shift match component $E_{match\_s}$ and a shift continuity component $E_{continuity\_s}$ represent shift energy 402. $E_{match\_s}$ 405 represents how well the alignment results match to the edge scribbles, and $E_{continuity\_s}$ 406 represents the continuity of the shifts (e.g., movement from edge scribbles to image edges).

In one embodiment, $E_{match\_i}$ is defined as the total image gradients covered by the resulting image edge points, as determined as follows by equation 2:

$$E_{match\_i} = -\sum_k G(e_k), \quad (2)$$

where $G(e_k)$ is the gradient at image edge point $e_k$.

In one embodiment, $E_{continuity\_i}$ is defined as the continuity of image features along consecutive image edge points in the alignment results, as determined as follows by equation 3:

$$E_{continuity\_i} = \sum_k \|I(e_k) - I(e_{k+1})\|, \quad (3)$$

where $I(e_k)$ is the image feature in the image patch around edge point k. In one embodiment, color, texture, and/or any other suitable image feature may be used as the image feature $I(e_k)$. The image features may be determined for a suitable region around edge point k. In one embodiment, for example, the region may comprise a square box (e.g., 7 pixels by 7 pixels). In another embodiment, the region may comprise a circular area having a suitable diameter.

In one embodiment, $E_{match\_s}$ is defined with a criterion that measures how the edge scribbles match to the aligned image positions, as determined as follows by equation 4.

$$E_{match\_s} = \sum_k M(s_k, e_k), \quad (4)$$

where $M(s_k, e_k)$ is the score (referred to herein as the point match score) representing how well the image edge point $e_k$ matches a point $s_k$ in the set of edge scribbles.

In one embodiment, $E_{continuity\_s}$ is defined as the continuity of the shift of all points in the edge scribbles, as determined as follows by equation 5:

$$E_{continuity\_s} = \sum_k \|\vec{D}(s_k, e_k) - \vec{D}(s_{k+1}, e_{k+1})\|, \quad (5)$$

where $\vec{D}(s_k, e_k)$ is the distance between image edge point $e_k$ and point $s_k$ in the set of edge scribbles.

FIG. 3B is a flowchart illustrating further aspects of the operation shown in block 306 of FIG. 3A, according to one embodiment. The operations shown in blocks 302 and 304 may be performed as discussed with reference to FIG. 3A. As shown in block 308 of FIG. 3B, match scores may be calculated for each scribble curve and each image curve to determine a possible correspondence. As shown in block 310, one or more candidate edge points may be selected for each point in each scribble, as a result of the operation shown in block 308. As shown in block 312, a minimal energy function (e.g., energy function 400) may be calculated to align each point in the scribble to a candidate point on an image edge. In one embodiment, a dynamic programming algorithm may be used to calculate the minimal energy function.

Figure 5A:
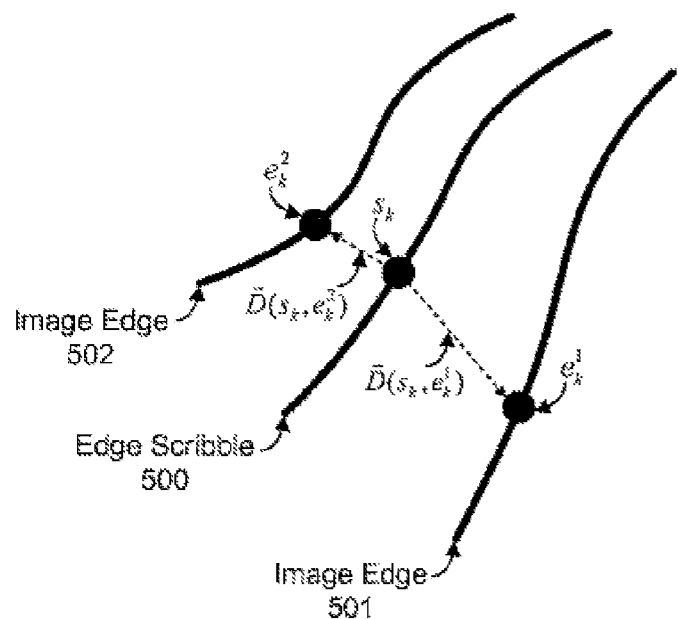
FIGS. 5A and 5B illustrate examples of an edge scribble between two candidate edges, according to one embodiment.

FIG. 5A illustrates an example of an edge scribble between two candidate edges. The edge scribble 500 represents a freeform line entered by a user. The image edges 501 and 502 represent the nearest image edges on either side of the scribble 500. Using the techniques described herein, the edge scribble 500 may be automatically aligned to one of the two candidate edges 501 and 502. Point $e_k^1$ represents the point on the image edge 501 corresponding to the point $s_k$ on the scribble 500, and point $e_k^2$ represents the point on the image edge 502 corresponding to the point $s_k$ on the scribble 500. $\vec{D}(s_k, e_k^1)$ is the distance between the points $e_k^1$ and $s_k$. $\vec{D}(s_k, e_k^2)$ is the distance between the points $e_k^2$ and $s_k$.

Figure 5B:
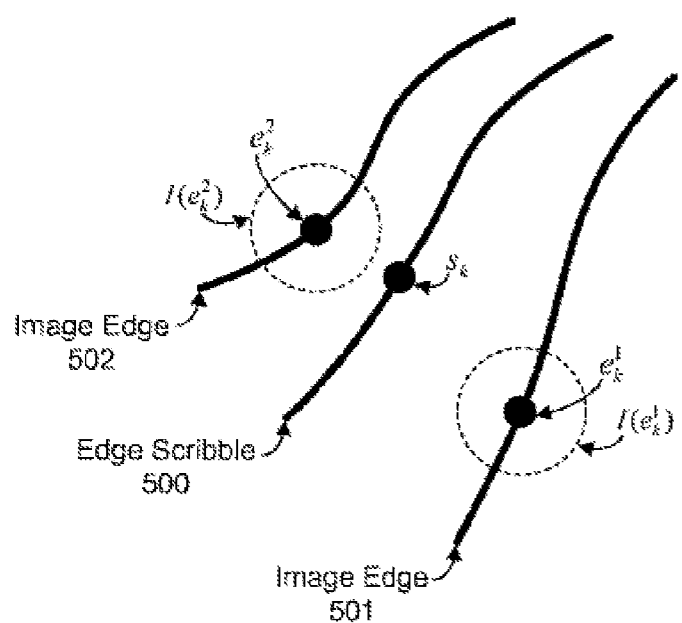

FIG. 5B further illustrates the example of an edge scribble between two candidate edges. $I(e_k^1)$ represents an image feature in the image patch around edge point $e_k^1$. $I(e_k^2)$ represents an image feature in the image patch around edge point $e_k^2$. The image features may comprise color, texture, and/or any other suitable image feature desirable for determining the continuity of image features along consecutive image edge points.

In one embodiment, the point match score in Equation 4 represents a criterion used to measure how closely an image edge point represents a point in the set of edge scribbles. In determining the point match score, the curve $l_e(e_k)$ in the image that goes through the edge point $e_k$, may be considered. In determining the point match score, the curve $l_s(s_k)$ in the set of edge scribbles that goes through the scribble point $s_k$ may also be considered. The point match score may include two parts: the match score, i.e., the match score between an image curve and a curve in the set of scribbles; and the match shift. The match shift may represent the displacement of points correspondence based on the curve match, as given as follows by equation 6:

$$M(s_k, e_k) = M_l(l_s(s_k), l_e(e_k)) + \alpha \vec{D}_p(e_k, B^e(s_k)) \quad (6)$$

In one embodiment, $M_l(l_s(s_k), l_e(e_k))$ is the match score of $l_s(s_k)$ and $l_e(e_k)$, where $l_e(e_k)$ is the image curve where point $e_k$ lies and $l_s(s_k)$ is the scribble curve where point $s_k$ lies. The definition for the match score of two curves $l_s$ and $l_e$ may be given as follows by equations 7, 8, and 9:

$$M_l(l_s, \{e_i \in l_e\})^* = \sum_{s_i \in l_s} \|\vec{D}(s_i, e_i)\| + \beta \sum_{s_i \in l_s} \|\vec{D}(s_i, e_i) - \vec{D}(s_{i+1}, e_{i+1})\| \quad (7)$$

$$M_l(l_s, l_e) = \min M_l(l_s, \{e_i \in l_e\})^* \quad (8)$$

$$B^e(s_k) = \operatorname{argmin}_{e_k \in l_e} M_l(l_s, \{e_i \in l_e\})^* \quad (9)$$

Thus, in one embodiment, $M_l(s_k), l_e(e_k))$ represents the optimal curve matching score, and $B^e(s_k)$ is the optimal correspondence of $s_k$.

Figure 6A:
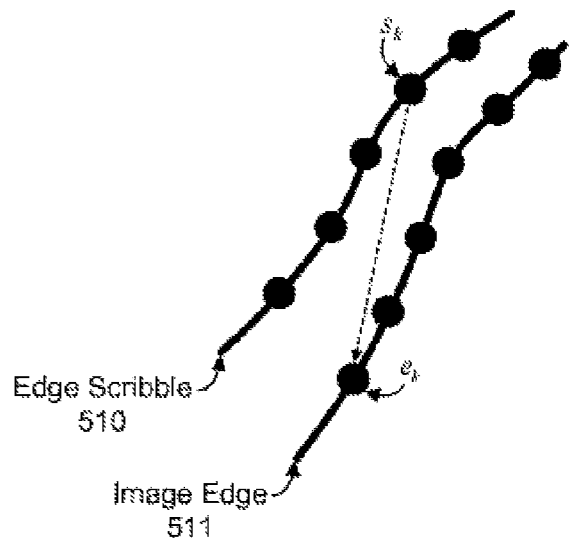
FIGS. 6A and 6B illustrate examples of a match shift, according to one embodiment.
Figure 6B:
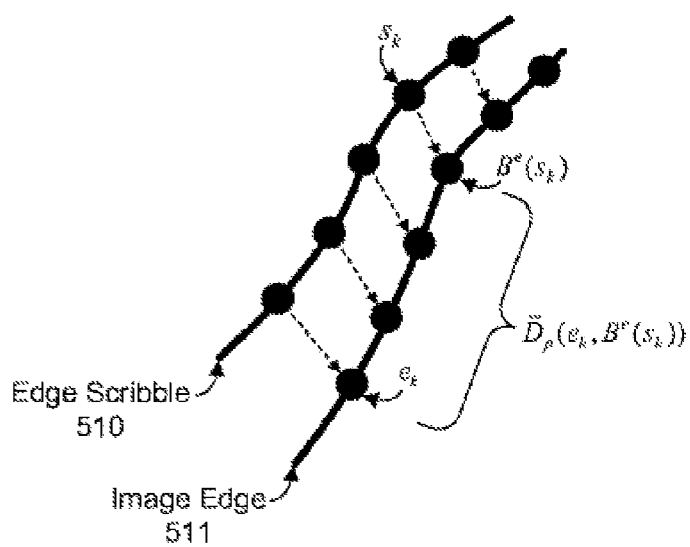
Figures 8A, 8B, 8C:
FIGS. 8A, 8B, and 8C illustrate an example of image warping using scribbles aligned to image edges, according to one embodiment.

In one embodiment, $\vec{D}_p(e_k, B^e(s_k))$ represents the match shift: the displacement of edge point $e_k$ and the position $B^e(s_k)$ to which $s_k$ optimally corresponds. In one embodiment, the displacement is determined by the number of points that lie between point $e_k$ and $B^e(s_k)$ plus one. FIGS. 6A and 6B illustrate an example of a visualization of a match shift $\vec{D}_p(e_k, B^e(s_k))$. In FIG. 6A, point $s_k$ on edge scribble 510 is matched to point $e_k$ on image edge 511. However, the match between $s_k$ and $e_k$ is not optimal. FIG. 8B illustrates an optimal match between $s_k$ and a point $B^e(s_k)$ on the image edge 511. The match shift $\vec{D}_p(e_k, B^e(s_k))$ represents the displacement in points from $B^e(s_k)$ (the position to which $s_k$ optimally corresponds) to $e_k$.

To select candidate edge points for each point on the scribble, the point correspondence between two curves may be determined, e.g., by minimizing $M_l(l_s, \{e_i \in l_e\})^*$. In one embodiment, based on the definition of $M_l(l_s, \{e_i \in l_e\})^*$, a dynamic programming algorithm may be used to locate a path with the least weight, with $\vec{D}(s_i, e_i)$ being the node weights and $\|\vec{D}(s_i, e_i) - \vec{D}(s_{i+1}, e_{i+1})\|$ the edge weights. The point correspondence of $s_k$ on curve $l_t$ may then be used as the candidate point $e_k^t = B^t(s_k)$.

After candidate edge points are selected from the image for alignment of points in the edge scribbles, the optimization of global energy may be formulated as a dynamic programming problem: selecting $e_k$ from $\{e_k^t\}$. Based on the equations discussed above, the optimized energy function may be determined as follows:

$$E = E_{match\_i} + \lambda E_{continuity\_i} + \mu E_{match\_s} + \nu E_{continuity\_s}$$

$$E = -\sum_k G(e_k) + \lambda \sum_k \|I(e_k) - I(e_{k+1})\| +$$

$$\mu \sum_k M(s_k, e_k) + \nu \sum_k \|\vec{D}(s_k, e_k) - \vec{D}(s_{k+1}, e_{k+1})\|$$

$$E = \sum_k (\lambda M(s_k, e_k) - G(e_k)) +$$

$$\sum_k (\mu \|I(e_k) - I(e_{k+1})\| + \nu \|\vec{D}(s_k, e_k) - \vec{D}(s_{k+1}, e_{k+1})\|)$$

In one embodiment, $(\lambda M(s_k,e_k) - G(e_k))$ is assigned as the node weights, and $(\mu\|I(e_k)-I(e_{k+1})\|+\nu\|\vec{D}(s_k,e_k)-\vec{D}(s_{k+1},e_{k+1})\|)$ is assigned as the edge weights. The path with minimal weight in this dynamic programming problem is the alignment with the minimal energy.

Figure 7:
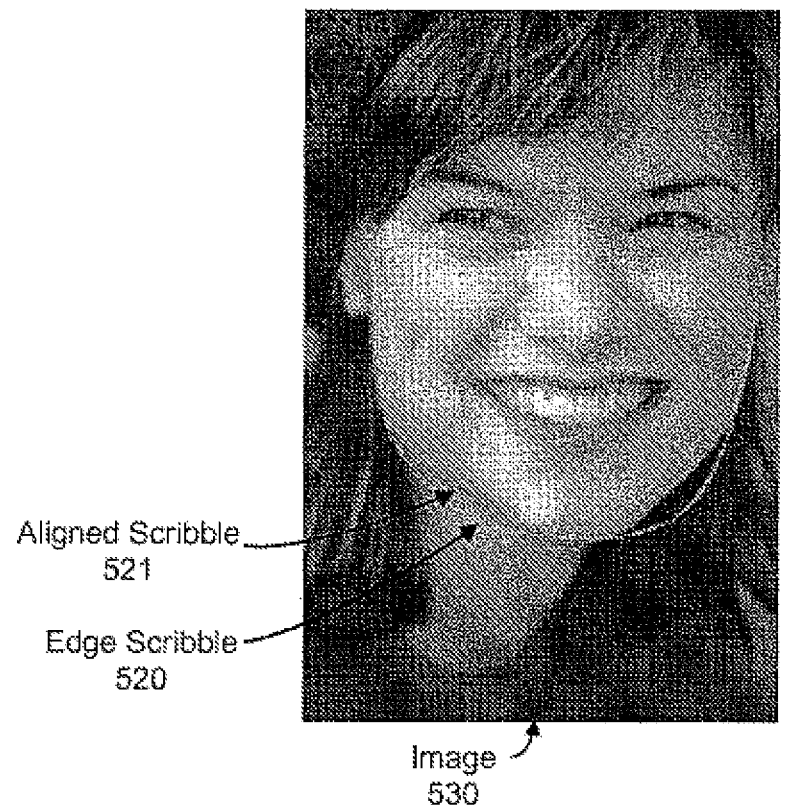
FIG. 7 illustrates an example of alignment of scribbles to image edges, according to one embodiment.

FIG. 7 illustrates an example result of the edge alignment techniques described herein. The edge scribble 520 represents a scribble entered by a user on top of an image 530. The edge scribble 520 is intended to roughly follow the outline of the subject's face. The aligned scribble 521 represents the result of the methods illustrated by FIG. 3A and/or FIG. 3B in one embodiment. As shown in FIG. 7, the aligned scribble 521 follows the outline of the subject's face more closely than the user-entered scribble 520.

FIGS. 8A, 8B, and 8C illustrate an example of image warping using scribbles aligned to image edges, according to one embodiment. FIG. 8A illustrates an original image. FIG. 8B illustrates the alignment of scribbles to image edges as previously shown in FIG. 7. By modifying one or more aligned edges, such as an edge closely following the subject's jawline, the user may warp the image. FIG. 8C illustrates a warped version of FIG. 8B in which the subject's jawline has been modified by moving one or more aligned edges.

Figure 9A:
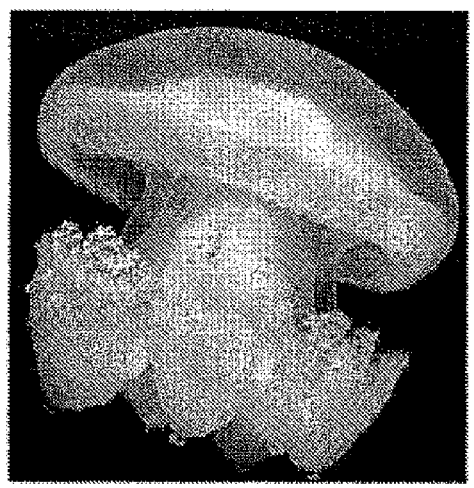
FIGS. 9A and 9B illustrate an example of interactive image stylization using scribbles aligned to image edges, according to one embodiment.
Figure 9B:
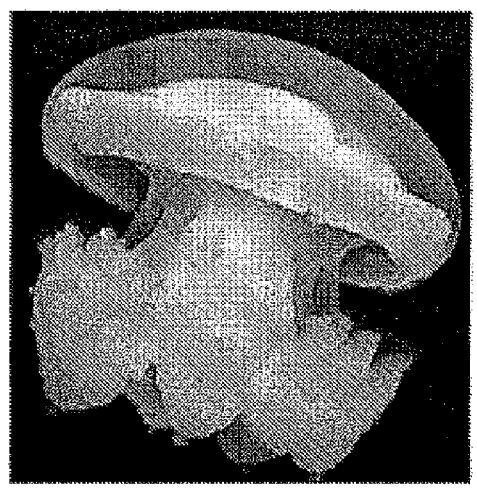

FIGS. 9A and 9B illustrate an example of interactive image stylization using scribbles aligned to image edges, according to one embodiment. Using non-photorealistic rendering techniques, the original image shown in FIG. 9A has been transformed into the cartoon-like image shown in FIG. 9B by suppressing some of its edges and exaggerating other edges. In such an application, the scribble alignment techniques discussed herein may permit a user to decide where edge suppression or exaggeration may be performed.

The edge alignment techniques described herein may also be used for the mitigation of color bleeding effects. Color bleeding is a common problem for region-based interactive image editing: colors may bleed around the areas where a boundary is difficult to determine automatically. To mitigate or solve the problem of color bleeding, the user may draw one or more scribbles to indicate a boundary and then use the automatic scribble alignment to localize the boundary.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   determining a plurality of edges in an image;
   receiving a user input comprising a scribble as a freeform line overlaid on the image; and
   automatically aligning the scribble to one or more of the edges in the image by selecting one or more candidate points on the one or more edges for each point on the scribble.

2. The method as recited in claim 1, wherein automatically aligning the scribble to one or more of the edges in the image comprises:
   determining a plurality of match scores, wherein each match score comprises a correspondence between a point on the scribble and a candidate point on one of the edges in the image.

3. The method as recited in claim 1, further comprising:
   determining a displacement from the one or more candidate points on the one or more edges in the image to each of the points on the scribble.

4. The method as recited in claim 1, further comprising:
   receiving an additional user input to modify the aligned scribble; and
   modifying the image based on the additional user input to modify the aligned scribble.

5. The method as recited in claim 1, wherein automatically aligning the scribble to one or more of the edges in the image comprises:
   minimizing an energy function.

6. The method as recited in claim 5, wherein the energy function comprises an image energy component and a shift energy component.

7. The method as recited in claim 6, wherein the image energy component comprises an image match component and an image continuity component.

8. The method as recited in claim 6, wherein the shift energy component comprises a shift match component and a shift continuity component.

9. A system, comprising:
   at least one processor to implement an image processing module as executable instructions, the image processing module configured to:
   determine a plurality of edges in an image;
   receive a user input comprising a scribble as a freeform line overlaid on the image;
   determine a plurality of match scores that each comprise a correspondence between a point on the scribble and a point on one of the edges in the image; and
   automatically align the scribble to one or more of the edges in the image based on the match scores.

10. The system as recited in claim 9, wherein the image processing module is configured to determine a displacement from each of the points on the scribble to the points on the one or more edges in the image.

11. The system as recited in claim 9, wherein the image processing module is configured to select one or more candidate points on the one or more edges in the image for each point on the scribble to automatically align the scribble to the one or more edges in the image.

12. The system as recited in claim 9, wherein the image processing module is configured to:
   receive an additional user input to modify the aligned scribble; and
   modify the image based on the additional user input to modify the aligned scribble.

13. The system as recited in claim 9, wherein the image processing module is configured to minimize an energy function to automatically align the scribble to the one or more edges in the image.

14. The system as recited in claim 13, wherein the energy function comprises an image energy component and a shift energy component.

15. A computer-readable memory device comprising an image processing module stored as executable instructions and, responsive to execution of the instructions by a computer device, the computer device performs operations of the image processing module comprising to:
- determine a plurality of edges in an image;
- receive a user input comprising a scribble as a freeform line overlaid on the image;
- align the scribble to one or more of the edges in the image;
- receive an additional user input to modify the aligned scribble; and
- modify the image based on the additional user input to modify the aligned scribble.

16. The computer-readable memory device as recited in claim 15, wherein the computer device performs the operations of the image processing module further comprising to:
- determine a plurality of match scores, wherein each match score comprises a correspondence between a point on the scribble and a point on one of the edges in the image; and
- align the scribble to the one or more edges in the image based on the match scores.

17. The computer-readable memory device as recited in claim 15, wherein the computer device performs the operations of the image processing module further comprising to select one or more candidate points on the one or more edges in the image for each point on the scribble to align the scribble to the one or more edges in the image.

18. The computer-readable memory device as recited in claim 15, wherein the computer device performs the operations of the image processing module further comprising to determine a displacement from points on the scribble to points on the one or more edges in the image.

19. The computer-readable memory device as recited in claim 15, wherein the computer device performs the operations of the image processing module further comprising to minimize an energy function to align the scribble to the one or more edges in the image.

20. The computer-readable memory device as recited in claim 19, wherein the energy function comprises an image energy component and a shift energy component.

* * * * *